F. GOFF.
NUT LOCK.
APPLICATION FILED APR. 18, 1914.

1,130,810.

Patented Mar. 9, 1915.

WITNESSES

Frank Goff, INVENTOR

BY

ATTORNEY

UNITED STATES PATENT OFFICE.

FRANK GOFF, OF CAMDEN, NEW JERSEY, ASSIGNOR OF ONE-HALF TO W. H. COX, OF CAMDEN, NEW JERSEY.

NUT-LOCK.

1,130,810. Specification of Letters Patent. Patented Mar. 9, 1915.

Application filed April 18, 1914. Serial No. 832,843.

*To all whom it may concern:*

Be it known that I, FRANK GOFF, a citizen of the United States, residing at Camden, in the county of Camden and State of New Jersey, have invented a new and useful Nut-Lock, of which the following is a specification.

The invention relates to improvements in nut locks.

The object of the present invention is to improve the construction of nut locks and to provide a simple, practical, and inexpensive nut lock, of strong and durable construction, designed for use on rail joints, machinery, and various other constructions subject to vibration, and capable of effectually preventing a nut from accidentally unscrewing.

A further object of the invention is to provide a nut lock of this character, which will require no alteration in the construction of the threaded bolt, and which will operate to lock the nut without injuring the latter or the threads of the bolt, and at the same time, permit the ready removal of the nut when desired.

With these and other objects in view the invention consists in the construction and novel combination of parts hereinafter fully described, illustrated in the accompanying drawing, and pointed out in the claim hereto appended, it being understood that various changes in the form, proportion, size and minor details of construction, within the scope of the claim, may be resorted to without departing from the spirit or sacrificing any of the advantages of the invention.

Figure 1:
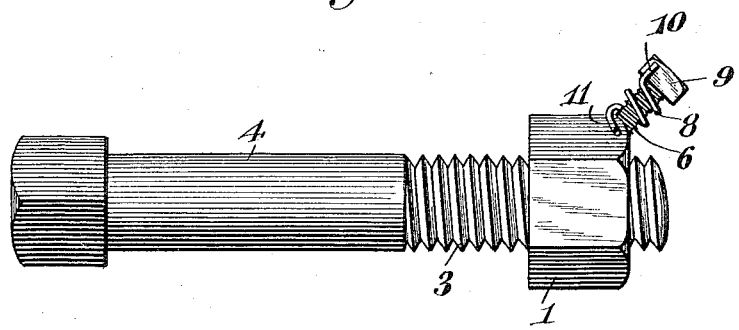
Figure 2:
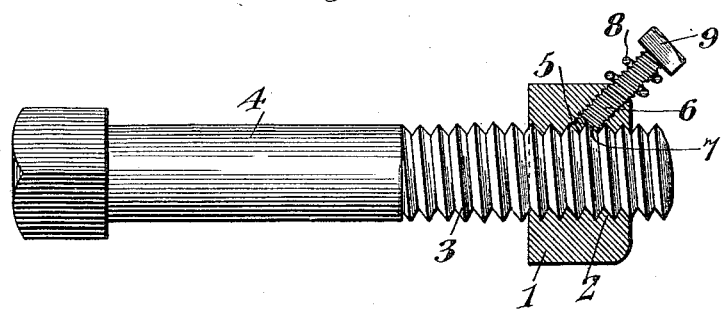
Figure 3:
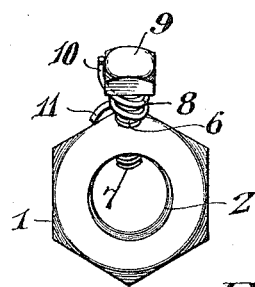

In the drawing: Figure 1 is a side elevation of a nut lock constructed in accordance with this invention. Fig. 2 is a central longitudinal sectional view of the same, the threaded bolt being shown in elevation. Fig. 3 is a front elevation of the nut and its locking means.

Like numerals of reference designate corresponding parts in all the figures of the drawing.

In the accompanying drawing, in which is illustrated the preferred embodiment of the invention, 1 designates a polygonal nut having a bolt opening 2 and adapted to screw on the threaded portion 3 of a bolt 4 in the usual manner. The nut is provided with a diagonally arranged bore 5 extending from one of the outer or front corners of the nut to the bolt opening 2 and communicating therewith at a point intermediate of the front and rear faces of the nut, and threaded to receive a locking screw 6. The locking screw 6 which is diagonally disposed, is arranged perpendicular to the inclined outer side faces of the threads of the bolt 4, and its inner engaging end 7 is set at an angle or inclination and coincides with the outer side faces of the threads and is adapted to fit flat against one of the side faces of the threads and frictionally engage the same, whereby the nut may be securely held against rotary movement without injuring the threads of the bolt. When it is desired to remove the nut, the screw is rotated in a direction to withdraw its inner engaging end out of contact with the face of the threads, and the nut may then be freely rotated on the bolt. By engaging the threads of the bolt in this manner, the locking nut may be screwed sufficiently tight to hold the nut without liability of injuring the bolt.

In order to hold the locking screw in engagement with the threaded portion of the bolt, the said screw is equipped with a coiled spring 8 interposed between the head 9 of the screw and the nut and having its outer end 10 engaged with the head of the screw, and its inner end 11 arranged to engage one of the faces of the polygonal nut. The outer end 10 of the coiled spring is extended and is arranged at the left hand edge of the nut in Fig. 3, in position to resist retrograde rotation of the screw, but instead of arranging the extended outer end of the spring in position to engage the head of the locking screw in this manner, the spring may be connected or engaged with the screw in any other suitable manner. By mounting the locking screw at one of the outer corners of the polygonal nut, the screw not only projects beyond the front face and the adjacent side faces, so as to be within convenient reach, but a plurality of angularly related faces are in position to be engaged by the inner end of the spring, thereby obviating the necessity of providing recesses, indentations, or other ratchet means, usually employed for analogous purposes.

What is claimed is:

In a nut lock, the combination with a threaded bolt, of a nut having a threaded diagonally arranged bore disposed perpendicularly of the outer inclined side faces of the threads of the bolt, a locking screw mounted in the threaded bore of the nut and having a flat inner end face set at an angle or inclination and coinciding with the inclined outer side faces of the threads of the bolt and arranged to fit flat against and frictionally engage one of the side faces of the same, and a coiled spring disposed on the outer portion of the locking screw and having its outer end engaged with the same, the inner end of the spring being extended to form an engaging portion, and the screw being located at one of the front corners of the polygonal nut, whereby a plurality of angularly disposed nut faces is presented to the engaging inner end of the spring.

In testimony, that I claim the foregoing as my own, I have hereto affixed my signature in the presence of two witnesses.

FRANK GOFF.

Witnesses:
BOYTON ADAMS,
F. G. TORAM.

Copies of this patent may be obtained for five cents each, by addressing the "Commissioner of Patents, Washington, D. C."